US008422485B2

(12) United States Patent
Jung et al.

(10) Patent No.: US 8,422,485 B2
(45) Date of Patent: Apr. 16, 2013

(54) METHOD AND SYSTEM FOR PROVIDING MULTIMEDIA PORTAL CONTENTS IN COMMUNICATION SYSTEM

(75) Inventors: Joon-Ho Jung, Suwon-si (KR);
Young-Ki Jeon, Hwaseong-si (KR);
Deug-Ku Chang, Yongin-si (KR);
Sang-Soo Chai, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1922 days.

(21) Appl. No.: 11/594,484

(22) Filed: Nov. 7, 2006

(65) Prior Publication Data

US 2007/0127655 A1 Jun. 7, 2007

(30) Foreign Application Priority Data

Nov. 7, 2005 (KR) .................. 10-2005-0106177
Nov. 14, 2005 (KR) .................. 10-2005-0108813

(51) Int. Cl.
*H04L 12/66* (2006.01)
(52) U.S. Cl.
USPC ..... 370/352; 370/338; 379/88.13; 379/220.01
(58) Field of Classification Search .................. None
See application file for complete search history.

(56) References Cited

U.S. PATENT DOCUMENTS

2004/0218034 A1* 11/2004 Wang et al. .................. 348/14.1
2004/0233892 A1* 11/2004 Roberts et al. ................ 370/352
2006/0045252 A1* 3/2006 Gorti et al. ............... 379/201.02
2006/0174014 A1 8/2006 Bae
2007/0047523 A1* 3/2007 Jiang .............................. 370/352
2007/0286163 A1* 12/2007 Oka et al. ....................... 370/352

FOREIGN PATENT DOCUMENTS

| KR | 1020040095838 | 11/2004 |
| KR | 1020050031477 | 4/2005 |
| KR | 1020050050182 | 5/2005 |
| KR | 1020050093518 | 9/2005 |
| KR | 1020060029874 | 4/2006 |
| KR | 1020060087912 | 8/2006 |

* cited by examiner

*Primary Examiner* — Asad M Nawaz
*Assistant Examiner* — Jason Harley
(74) *Attorney, Agent, or Firm* — The Farrell Law Firm, P.C.

(57) ABSTRACT

A system and method for providing multimedia portal contents in a communication system. The method provides a ring-back tone to a calling terminal, the calling terminal sets first multimedia portal contents to be provided as the ring-back tone in consideration of given information of a calling terminal user. A called terminal sets second multimedia portal contents to provide as the ring-back tone in consideration of the given information of the calling terminal user, and the calling and called terminals transmit call connection setup related signals including set information. A first server receives the call connection setup-related signals and provides specific multimedia portal contents as the ring-back tone when the calling and called terminals set the multimedia portal contents, and provides the determined multimedia portal contents to the calling terminal.

22 Claims, 9 Drawing Sheets

METHOD AND SYSTEM FOR PROVIDING MULTIMEDIA PORTAL CONTENTS IN COMMUNICATION SYSTEM

PRIORITY

This application claims priority under 35 U.S.C. §119 to applications filed in the Korean Industrial Property Office on Nov. 7 and 14, 2005, and assigned Serial Nos. 2005-106177 and 2005-108813, respectively, the contents of which are incorporated herein by reference.

BACKGROUND OF THE INVENTION

1. Field of the Invention

The present invention relates to a communication system, and more particularly to a method and an apparatus for providing multimedia portal contents in a communication system.

2. Description of the Related Art

In general, an IP (Internet Protocol) Multimedia Subsystem (IMS) refers to a system for providing IP-based packet communication services. The IMS stands on the basis of a Session Initiation Protocol (SIP) which is a text-based application layer control protocol. The SIP is based on a client/server structure in which a server responds to clients' call initiation, and enables one or more participants to jointly establish, modify and terminate a session. Such a session includes teleconferencing, telephony, interviewing, event notification, Instant Messaging (IM) and so forth, all using the Internet. The SIP follows the existing text-based internet standards, and thus facilitates fault repair, network debugging, etc.

In an SIP-based multimedia telephony environment, a 180 ringing message is used for providing a ring-back tone to a calling terminal. If the calling terminal receives the 180 ringing message, it generates a local ring-back tone or reproduces ring-back tone data contained within the 180 ringing message to thereby provide the ring-back tone to a calling terminal user.

Also, in the SIP-based multimedia telephony environment, an INVITE message is used for providing a bell to a called terminal. If the called terminal receives the INVITE message, it generates an already stored bell or reproduces ring-back tone data contained within the INVITE message to thereby provide the stored bell or ring-back tone to a called terminal user.

In the existing Public Switched Telephone Network (PSTN), Code Division Multiple Access (CDMA) and Wideband Code Division Multiple Access (WCDMA) communication systems, a calling terminal has been provided with only a basic ring-back tone or a ring-back tone predetermined by a calling-/called-party, and a called terminal has also been provided with only a pre-stored audio bell.

That, in the conventional communication systems, a calling terminal and a called terminal have been provided with a bell or a ring-back tone irrespective of their user's intentions, preferences and tastes. This is because there is a conventional terminals and corresponding resources (e.g., telephone systems) have limited performance for providing multimedia alerting. However, as current communication systems evolve from the 3G communication systems to the 4G communication systems, terminals are also upgraded to high performance terminals so as to be fully compatible with the 4G communication system. Further, service levels demanded by users are becoming correspondingly higher.

SUMMARY OF THE INVENTION

Accordingly, the present invention has been made to solve at least the above-mentioned problems occurring in the prior art, and an object of the present invention is to provide a method and a system for providing an effective bell or ring-back tone in the form of portal contents by using presence information or location information of a terminal user in a communication system.

In order to accomplish this object, in accordance with one aspect of the present invention, there is provided a system for providing a ring-back tone to a calling terminal, the system includes the calling terminal for setting first multimedia portal content to be provided as the ring-back tone in consideration of given information of a calling terminal user, and requesting call connection setup including set information; a called terminal for setting second multimedia portal contents to provide as the ring-back tone in consideration of the given information of the calling terminal user, and transmitting a message including set information; a first server for receiving call connection setup-related signals from the calling and called terminals, determining, according to a predetermined priority, to provide specific multimedia portal contents as the ring-back tone when the calling and called terminals set the multimedia portal contents, and providing the determined multimedia portal contents; and an information server for providing the given information of the calling terminal user and given information of a called terminal user to the first server.

In accordance with another aspect of the present invention, there is provided a system for providing a bell to a called terminal, the system includes a calling terminal for setting first multimedia portal contents to provide as the bell in consideration of given information of a calling terminal user, and requesting call connection setup including set information; the called terminal for setting second multimedia portal contents to be provided as the bell in consideration of given information of a called terminal user, and reproducing the first or second multimedia portal contents as the bell according to a predetermined priority whenever a request for the call connection setup is received; a first server for providing the first or second multimedia portal contents to the calling and called terminals; and an information server for providing the given information of the calling and called terminal users to the first server.

In accordance with yet another aspect of the present invention, there is provided a method for providing a ring-back tone to a calling terminal, the method including setting, by the calling terminal, first multimedia portal contents to be provided as the ring-back tone in consideration of given information of a calling terminal user; setting, by a called terminal, second multimedia portal contents to provide as the ring-back tone in consideration of the given information of the calling terminal user; transmitting, by the calling and called terminals, call connection setup related signals including set information; and, receiving, by a first server, the call connection setup-related signals, determining, according to a predetermined priority, to provide specific multimedia portal contents as the ring-back tone when the calling and called terminals set the multimedia portal contents, and providing the determined multimedia portal contents to the calling terminal.

In accordance with still yet another aspect of the present invention, there is provided a method for providing a bell to a called terminal, the method including setting, when a calling terminal desires to provide first multimedia portal content as the to the called terminal, in advance the first multimedia portal contents and requesting call connection setup; setting, by the called terminal, in advance second multimedia portal contents as the bell in to be provided with the second multimedia portal contents as the bell; and, reproducing, by the called terminal any one the first and second multimedia portal contents, which are provided from a specific server, according to a predetermined priority whenever a request for the call connection setup is received.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention provides a system and a method for providing multimedia portal contents corresponding to set presence information or location information in a communication system using an IMS (Internet Protocol Multimedia Subsystem). Although a communication system using an IMS will be described with respect to the following embodiments of the present invention, the inventive system and method of the present invention may also be applied to other communication systems.

The present invention may be divided into a method for providing a bell in order to inform a called terminal that a call is requested from a calling terminal, and a method for providing a ring-back tone in order to make a calling terminal aware of its current request for a call. Here, the ring-back tone refers to a tone which a called terminal provides to a calling terminal when the calling terminal requests a call to the called terminal, or a tone which the calling terminal itself sets in advance. On the contrary, the bell refers to a tone which a calling terminal provides to a called terminal when the calling terminal requests a call to the called terminal, or a tone which the called terminal itself sets in advance. According to the present invention, the bell or ring-back tone is provided in the form of a multimedia portal contents, and a calling or called terminal is provided with the multimedia portal contents as the bell or ring-back tone according to presence or location information set in at least one or more of the calling terminal, the called terminal and a Personal IMS Portal application server (PIP server). Here, the presence information includes information representing the presence of a terminal user and can also include information indicative of:

Call states: busy, available, etc.;

Activity states: in conference, at dinner, while driving, asleep, while public performance viewing, etc.;

Emotion states: joy, sorrow, boredom, etc.;

Anniversaries: birthday, wedding anniversary, examination passing date, etc. Also, the location information includes information representing the location of a terminal user, and information provided by a terminal may differ according to whether the terminal has a reception function for a Global Positioning System (GPS). For example the location information can include information such as:

In case of having reception function for GPS: location information of terminal user;

In case of having no reception function for GPS: location information of base station.

That is, according to the present invention, a calling terminal or a called terminal provides (or is provided with) multimedia portal content including a bell tone or a ring-back tone on the basis of the presence or location information. For example, when presence information of a calling terminal user represents a mood of the user, a calling terminal may set multimedia portal contents representative of the mood information as a bell or ring-back tone. Further, when the calling terminal user passes through a specific area, the calling terminal may set multimedia portal contents representative of a corresponding location, that is, an image, a music, a melody or the like representing corresponding location information, as a bell or ring-back tone.

Figure 1:
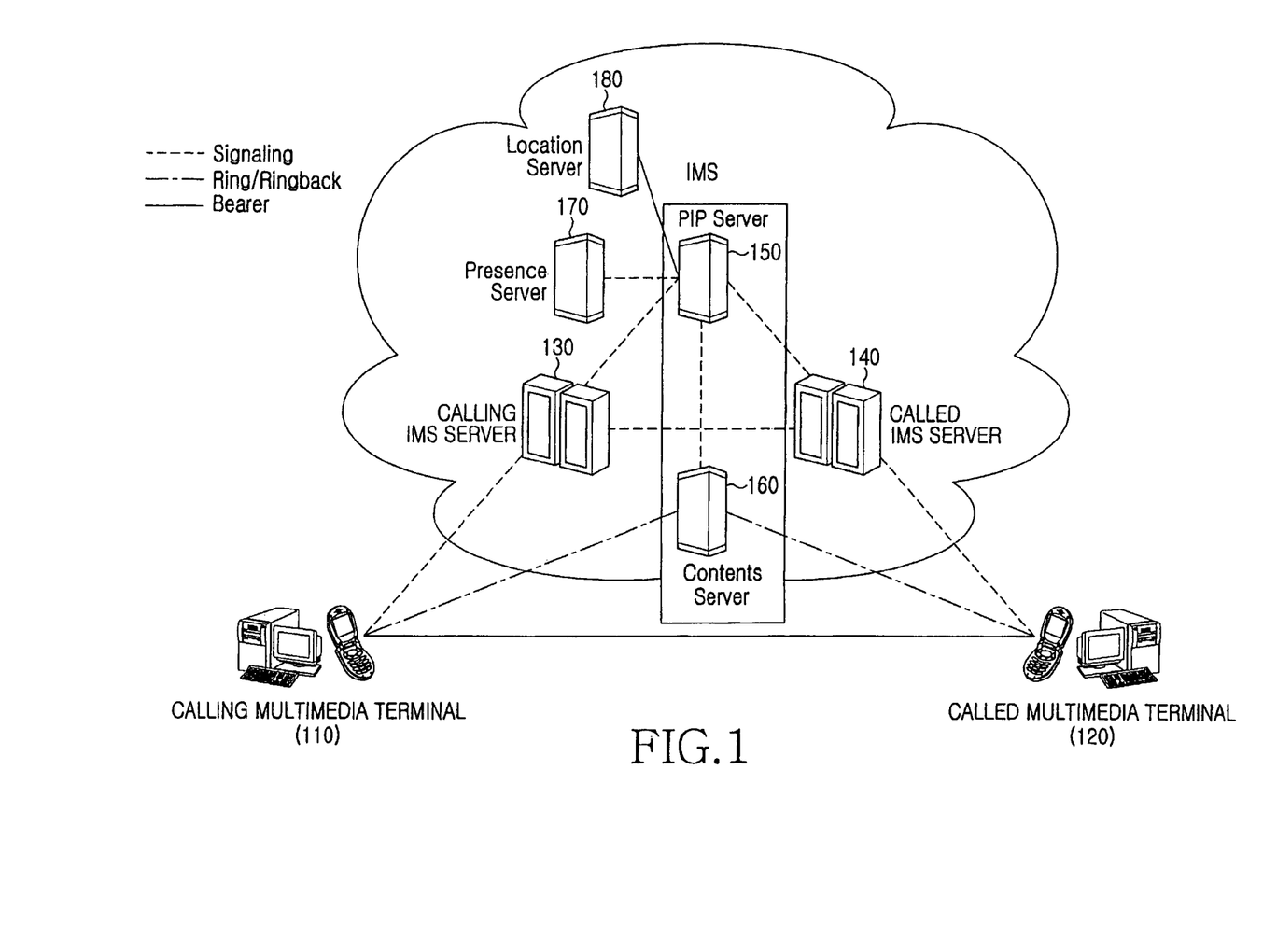
FIG. 1 is a block diagram illustrating a structure of a communication system for providing multimedia portal contents in accordance with the present invention.

FIG. 1 is a block diagram illustrating a structure of a communication system for providing multimedia portal contents according to the present invention.

Referring to FIG. 1, the communication system includes a calling terminal 110 and a called terminal 120 which have multimedia functions, a calling IMS server 130 and a called IMS server 140 capable of processing corresponding sessions of the calling and called terminals 110 and 120, a PIP server 150 for providing multimedia portal contents to the calling and called terminals 110 and 120, a contents server 160 for maintaining/managing contents resources. A presence server 170 is a server which may implemented in an actual communication environment, and maintains/manages presence information of a corresponding terminal user. According to the present invention, the communication system may also include a location server 180 which is a server for maintaining/managing location information of a corresponding terminal user. In other words, the present invention may be coupled with an IM server, a data manipulation server, a Location Based Server (LBS), etc., in addition to the presence server 170 and the location server 180. Herein, coupling with the LBS for maintaining/managing location information of a terminal user will be described in detail below.

Reference will now be made in detail to the roles and the preconditions of the above-mentioned terminals and servers.

The calling and called terminals 110 and 120 may be wired, and/or wireless or combined wired/wireless terminals, and are assumed have processing power which is sufficient for reproducing multimedia portal contents. Further, the calling and called terminals 110 and 120 are assumed have voice/multimedia recording and reproducing functions, and be able to transmit/receive specific multimedia through the header of an SIP message.

The calling and called IMS servers 130 and 140 control call setup and call release between the calling and called terminals 110 and 120, and perform service processing for coupling to the PIP server 150 when specific alerting to the calling and called terminals is necessary according to the service profile of a corresponding terminal user.

The PIP server 150 provides multimedia portal contents to the calling and called terminals 110 and 120. That is, it performs a function of transmitting multimedia portal contents to the calling and called terminals 110 and 120 at the request of the IMS servers 130 and 140.

The contents server 160 maintains/manages multimedia portal contents including a HyperText Transfer Protocol (HTTP), a Wireless Application Protocol (WAP), a flash animation and so forth as well as audio, video, images, and/or messages. Preferably, the contents server 160 must be implemented integrally with the PIP server 150.

Reference will now be made to a method for providing a bell tone or a ring-back tone by using presence information or location information according to a of the present invention.

I. Method for Providing Bell in Form of Multimedia Contents

There are three types of cases where a called terminal can be provided with multimedia portal contents when a calling terminal requests call connection setup. These cases are:

1. Case where Calling Terminal Provides Multimedia Portal Contents:
    A calling terminal user personally selects multimedia portal contents according to his/her presence or location information, and provides the selected multimedia portal contents as a bell to a called terminal;
    A calling terminal selects multimedia portal contents according to presence or location information set by a terminal user, and provides the selected multimedia portal contents as a bell to a called terminal;
    A calling terminal previously acquires presence or location information of a called terminal user before requesting call connection setup, selects multimedia portal contents according to the acquired presence or location information, and provides the selected multimedia portal contents as a bell to a called terminal;

2. Case where Calling PIP Server Provides Multimedia Portal Contents:
    A calling PIP server selects multimedia portal contents according to presence or location information set by a calling terminal user, and provides the selected multimedia portal contents as a bell to a called terminal;
    A calling PIP server selects multimedia portal contents according to presence or location information set by a called terminal user, and provides the selected multimedia portal contents as a bell to a called terminal; and 3. Case where Called PIP Server Provides Multimedia Portal Contents:
    A called PIP server selects multimedia portal contents according to presence or location information set by a called terminal user, and provides the selected multimedia portal contents as a bell to a called terminal;
    A called PIP server selects multimedia portal contents according to presence or location information set by a calling terminal user, and provides the selected multimedia portal contents as a bell to a called terminal.

In the three types of cases of providing multimedia portal content as a bell to a called terminal, the multimedia portal contents must be determined according to priority. Such priority may be adaptively determined pursuant to a service provider's policy, and a preferred example of the priority will be described later.

II. Method for Providing Ring-Back Tone in Form of Multimedia Portal Contents According to the Present Invention There are three types of cases where a called terminal can provides multimedia portal contents as a ring-back tone when a calling terminal requests call connection setup. These cases are:

1. Case where Called Terminal Provides Multimedia Portal Contents:
    A called terminal selects multimedia portal contents according to presence or location information set by a called terminal user, and provides the selected multimedia portal contents as a ring-back tone to a calling terminal;
    A called terminal previously acquires presence or location information of a calling terminal user, selects multimedia portal contents according to the acquired presence or location information, and provides the selected multimedia portal contents as a ring-back tone to a calling terminal;

2. Case where Called PIP Server Provides Multimedia Portal Content:
    A called PIP server selects multimedia portal contents according to presence or location information set by a called terminal user, and provides the selected multimedia portal contents as a ring-back tone to a calling terminal;
    A called PIP server selects multimedia portal contents according to presence or location information set by a calling terminal user, and provides the selected multimedia portal contents as a ring-back tone to a calling terminal; and 3. Case where Calling PIP Server Provides Multimedia Portal Contents:
    A calling PIP server selects multimedia portal contents according to presence or location information of a calling terminal user, and provides the selected multimedia portal contents as a ring-back tone to a calling terminal;
    A calling PIP server selects multimedia portal contents according to presence or location information of a called terminal user, and provides the selected multimedia portal contents as a ring-back tone to a calling terminal.

In the three types of cases of providing multimedia portal contents as a ring-back tone to a calling terminal, the multimedia portal contents must be determined according to priority. Such priority may be adaptively determined pursuant to a service provider's policy. For example, according to the present invention, it is assumed that prioritization schemes as described below are used.

Firstly, the priority of multimedia portal contents to be used as a bell can be determined as follows:

1. Multimedia portal contents set by called terminal or called terminal user;
2. Multimedia portal contents set by called PIP server;
3. Multimedia portal contents set by calling terminal;
4. Multimedia portal contents set by calling PIP server.

Secondly, the priority of multimedia portal contents to be used as a ring-back tone can be set as follows:

1. Multimedia portal contents set by calling terminal or calling terminal user;
2. Multimedia portal contents set by calling PIP server;
3. Multimedia portal contents set by called terminal;
4. Multimedia portal contents set by called PIP server.

As described above, when there is first multimedia portal contents set by a calling terminal and second multimedia portal contents set by a called terminal, and is to be used as a bell, a bell reproduced in the called terminal is assumed to be the second multimedia portal contents because the first multimedia portal contents has lower priority than that of the second multimedia portal contents.

In contrast with this, when multimedia portal content is used as a ring-back tone (as opposed to a bell), a calling terminal requesting call connection setup has priority over other terminal. Thus, multimedia portal contents set by the calling terminal has the highest priority. However, these prioritization schemes are merely illustrative, and may be implemented in various forms.

Figure 2:
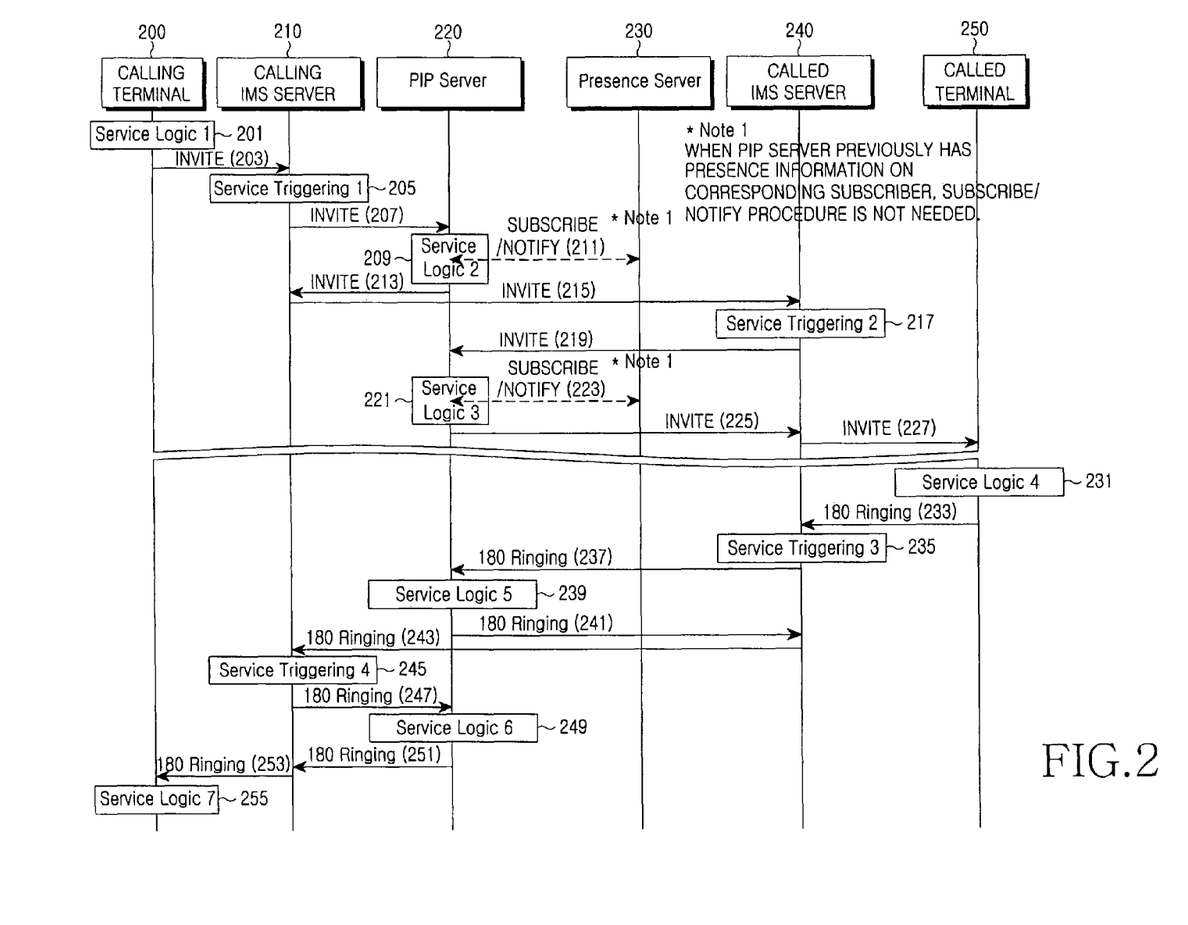
FIG. 2 is a flow diagram illustrating a method for providing multimedia portal contents in accordance with the present invention.

FIG. 2 illustrates signal flows for providing multimedia portal contents according to the present invention. To be specific, FIG. 2 illustrates a signal flow diagram in which a calling or called terminal provides multimedia portal contents in the form of a bell or ring-back tone according to the terminal's presence information.

Referring to FIG. 2, a calling terminal 200 performs service logic 1 before requesting call connection setup to a calling IMS server 210 (step 201). Here, the service logic 1 refers to a procedure in which a calling terminal user personally sets multimedia portal contents suitable to his/her presence as a bell, the calling terminal 200 sets multimedia portal contents as a bell according to presence information set by the user, or the calling terminal 200 acquires presence information of a called terminal 250 before a call attempt and sets multimedia portal contents suitable to the acquired presence information as a bell tone. Of course, the calling terminal 200 may not set specific multimedia portal contents as a bell.

Next, the calling terminal 200 transmits an INVITE message for requesting call connection setup to the calling IMS server 210 (step 203). If the calling terminal 200 sets specific multimedia portal contents, then the set multimedia portal content is included in the INVITE message. As an example, multimedia portal contents information in the form of "Alert-Info: http://www.example.com/movie/multimedia.avi>" may be included in a header portion of the INVITE message.

As the calling IMS server 210 receives the INVITE message including multimedia portal contents information from the calling terminal 200, it performs service triggering 1 (step 205). Here, the service triggering refers to a procedure in which, when a calling terminal requests call connection setup, an IMS server determines which service is provided to the calling terminal, and requests a corresponding service to an application server providing the service, that is, a PIP server 220 as shown in FIG. 2. Corresponding to the service triggering 1, the calling IMS server 210 transmits the INVITE message to the PIP server 220 (step 207).

If the PIP server 220 receives the INVITE message, it performs service logic 2 for setting multimedia portal contents corresponding to presence information of the calling terminal 200 (step 209). If there are multimedia portal contents set by the calling terminal 200, the PIP server 220 uses the set multimedia portal contents in its entirety. Here, the set multimedia portal contents is used according to a priority of setting multimedia portal contents according to presence information. After the PIP server 220 performs the service logic 2, it transmits the INVITE message to the calling IMS server 210 (step 213). In the meantime, the PIP server 220 can acquire presence information of each terminal user by communicating periodically or non-periodically with a presence server 230 for maintaining/managing the presence information of each terminal user (steps 211 and 223).

The calling IMS server 210 then transmits the INVITE message to a called IMS server 240 (step 215). As the called IMS server 240 receives the INVITE message, it performs service triggering 2 (step 217). Thereafter, the called IMS server 240 transmits the INVITE message to the PIP server 220 because the called terminal 250 corresponding to a destination of the INVITE message sets multimedia portal contents according to its (i.e., the called terminal's 250) presence information (step 219). However, if the called terminal 250 sets no multimedia portal contents, then the INVITE message in step 215 is transmitted intact to the called terminal 250.

Next, the PIP server 220 performs service logic 3 for setting multimedia portal contents according to presence information of the called terminal 250 (step 221). Even if there is multimedia portal contents set by the calling terminal 200, the PIP server 220 selects multimedia portal contents set by the called terminal 250 as a bell, based on the priority of multimedia portal contents setting. The PIP server 220 transmits the INVITE message including multimedia portal contents information set as described above to the called IMS server 240 (step 225). The called IMS server 240 transmits the received INVITE message to the called terminal 250 (step 227).

The called terminal 250 reproduces multimedia portal contents through service logic 4, and determines a ring-back tone to be provided to the calling terminal 200 (step 231). That is, the called terminal 250 recognizes the multimedia portal contents information included in the INVITE message as a bell, and reproduces the same. The multimedia portal contents reproduced in the called terminal 250 may include various types of contents such as audio, a still image, a moving picture, a flash animation and the like.

Prior to the transmission of a 180 ringing message, the called terminal 250 performs the following procedure of setting a ring-back tone to be provided to the calling terminal 200, as a part of the service logic 4 operation. Of course, the called terminal 250 may not perform the ring-back tone setting operation.

The called terminal sets multimedia portal contents to be provided as a ring-back tone according to presence information of a called terminal user.

When the called terminal has already acquired presence information of the calling terminal, the called terminal sets multimedia portal contents to be provided as a ring-back tone according to the acquired presence information.

The called terminal 250 then transmits the 180 ringing message including the set or (non-set) multimedia portal contents information to the called IMS server 240 (step 233). Herein, for the sake of clarity, it is assumed that the called terminal 250 sets specific multimedia portal contents as a ring-back tone. The called IMS server 240 recognizes the multimedia portal contents information included in the 180 ringing message, and performs service triggering 3 for transmitting the message to the PIP server 220 (step 235). The called IMS server 240 transmits the 180 ringing message to the PIP server 220 (step 237).

Next, the PIP server 220 performs service logic 5 for setting multimedia portal content to be provided as a ring-back tone according to presence information of a called terminal user (step 239). If there is multimedia portal contents set by the called terminal 250, the PIP server uses the multimedia portal contents set by the called terminal 250 in its entirety. The PIP server 220 transmits the 180 ringing message to the called IMS server 240 (step 241). The called IMS server 240 then transmits the 180 ringing message to the calling IMS server 210 (step 243). The calling IMS server 210 performs service triggering 4 to recognize that the 180 ringing message be transmitted to the PIP server 220 (step 245), and then transmits the 180 ringing message to the PIP server 220 (step 247).

The PIP server 220 performs service logic 6 for setting multimedia portal content to be provided as a ring-back tone according to presence information of a calling terminal user (step 249). If multimedia portal contents set by a called party and multimedia portal contents set by a calling party exist together, the PIP server 220 provides the multimedia portal contents set by the calling party as a ring-back tone pursuant to the priority of multimedia portal contents setting. In this way, the PIP server 220 transmits the 180 ringing message to the calling IMS server 210 (step 251).

The calling IMS server 210 then transmits the 180 ringing message to the calling terminal 200 (step 253). The calling terminal 200 performs service logic 7 for reproducing multimedia portal contents included in the 180 ringing message (step 255).

The multimedia portal contents as illustrated in FIG. 2 can be provided using any of the following methods:

(1). multimedia portal contents of a binary format are carried by an INVITE message, and a terminal executes the binary multimedia portal contents.

(2) an INVITE message includes a URL (Uniform Resource Locator) address of multimedia portal contents, and a terminal downloads the multimedia portal contents from the corresponding URL and executes the downloaded multimedia portal contents; and 3. information enabling real-time connection with a server for providing multimedia portal contents is included in an INVITE message, and a terminal sets up real-time connection with the corresponding server by using the INVITE message and receives the multimedia portal contents from the server.

To perform the operations described in FIG. 2, it is preferred that the respective terminals and servers execute or provide the following functions:

1. Calling and Called Terminals Requirements:
A terminal provide an interface and a function enabling a user to select multimedia portal contents according to his/her presence.
A terminal perform a function of setting multimedia portal content based on presence information having been set by a user.
A terminal executes and receives multimedia portal content provided through a bell or ring-back tones.
2. PIP Server Requirements:
A PIP server has a function of acquiring presence information of a user from a presence server.
A PIP server has a function of selecting and transmitting multimedia portal contents based on presence information of a user.
A PIP server has a function of selecting and transmitting multimedia portal contents in consideration priority when all of users/terminals/calling and called PIP servers set multimedia portal contents.

Figure 3:
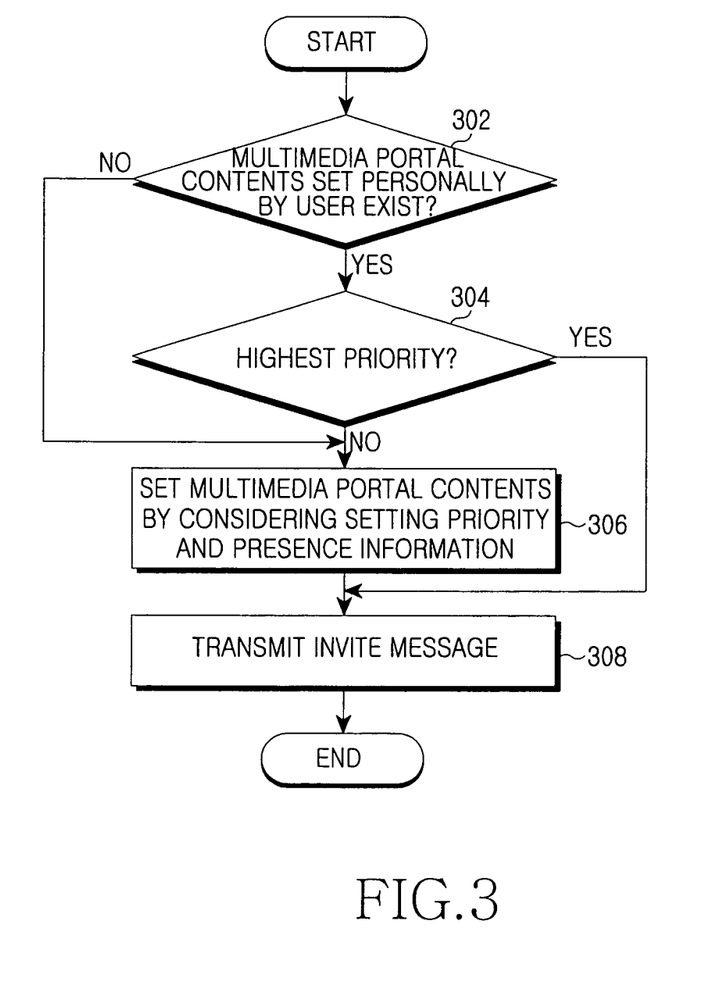
FIG. 3 is a flowchart illustrating an operational procedure in which a calling terminal provides multimedia portal contents as a bell in accordance with the present invention.

FIG. 3 illustrates a flowchart of an operational procedure in which a calling terminal provides multimedia portal contents as a bell to a called terminal according to the present invention. To be specific, FIG. 3 illustrates an operational procedure in which a calling terminal provides multimedia portal content as a bell to a called terminal according to presence information.

Referring to FIG. 3, in step 302, the calling terminal determines if there is multimedia portal contents set personally by a user. If as a result of the determination in step 302, the calling terminal determines that there is multimedia portal contents set by a user, the calling terminal proceeds to step 304. However, if multimedia portal content is determined not to exist, the calling terminal proceeds to step 306. In step 304, the calling terminal determines if the multimedia portal contents set by the user has the highest priority. A result of the determination in step 304 shows that the multimedia portal contents does not have the highest priority, the calling terminal proceeds to step 306 and, if not so, it proceeds to step 308.

In step 306, the calling terminal sets multimedia portal contents to be provided to the called terminal in consideration of multimedia portal contents setting priority and presence information set by the user, and then proceeds to step 308. In step 308, the calling terminal transmits an INVITE message including information on the set multimedia portal contents to a calling IMS server.

Figure 4:
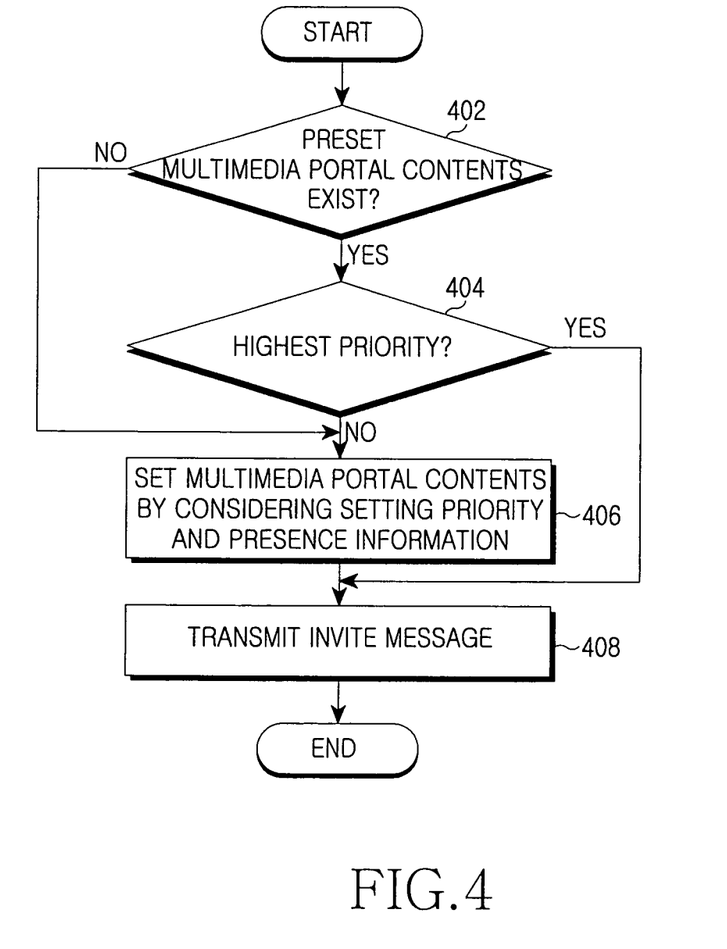
FIG. 4 is a flowchart illustrating an operational procedure in which a calling PIP server provides multimedia portal contents as a bell in accordance with the present invention.

FIG. 4 illustrates a flowchart of an operational procedure in which a calling PIP server provides multimedia portal contents as a bell to a called terminal according to the present invention. To be specific, FIG. 4 illustrates an operational procedure in which a calling PIP server provides multimedia portal content as a bell to a called terminal according to presence information.

Referring to FIG. 4, in step 402, the calling PIP server determines if there is preset multimedia portal contents. Here, the preset multimedia portal contents refers to multimedia portal contents set personally by a user or multimedia portal contents which a calling terminal sets according to presence information of a user. If a result of the determination in step 402, it is determined that there is preset multimedia portal contents, the calling PIP server proceeds to step 404. However, if preset multimedia portal content exist, the calling PIP server proceeds to step 406.

In step 404, the calling PIP server determines if the preset multimedia portal contents has the highest priority. If a result of the determination in step 404, it is determined that the preset multimedia portal contents does not have the highest priority, the calling PIP server proceeds to step 406 Otherwise, the calling PIP server proceeds to step 408. In step 406, the calling PIP server sets multimedia portal contents to be provided to the called terminal in consideration of multimedia portal contents setting priority and preset presence information, and then proceeds to step 408. In step 408, the calling PIP server transmits an INVITE message including information on the set multimedia portal contents to a called IMS server.

Figure 5:
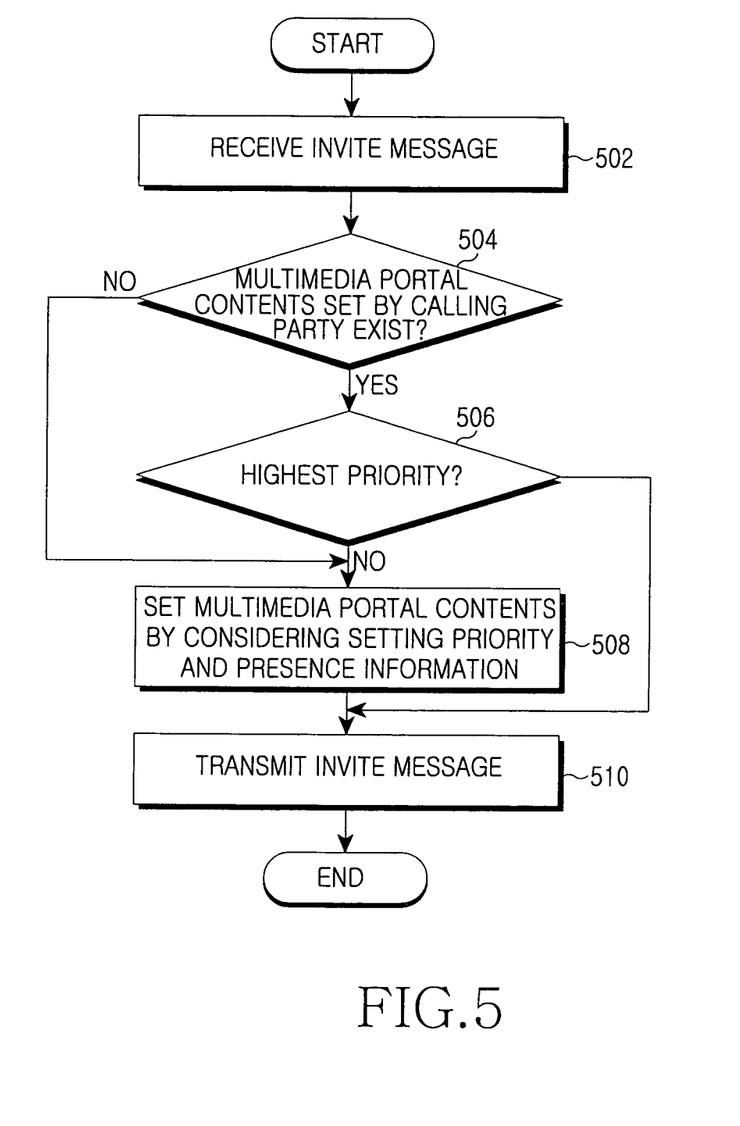
FIG. 5 is a flowchart illustrating an operational procedure in which a called PIP server provides multimedia portal contents as a bell in accordance with the present invention.

FIG. 5 illustrates a flowchart of an operational procedure in which a called PIP server provides multimedia portal contents as a bell to a called terminal according to the present invention. To be specific, FIG. 5 illustrates an operational procedure in which a called PIP server provides multimedia portal contents as a bell tone to a called terminal according to presence information.

Referring to FIG. 5, in step 502, the called PIP server receives an INVITE message from a called IMS server, and then proceeds to step 504. In step 504, the called PIP server determines if multimedia portal contents set by a calling party, that is, a calling terminal, a calling terminal user, or a calling PIP server, exist in the INVITE message. If as a result of the determination in step 504, it is determined that multimedia portal contents set by a calling party exists, the called PIP server proceeds to step 506. However, if multimedia portal content is determined not to exist, the called PIP server proceeds to step 508. In step 506, the calling PIP server determines if the set multimedia portal content has the highest priority. If as a result of the determination in step 506 it is determined that the set multimedia portal contents does not have the highest priority, the called PIP server proceeds to step 510. Otherwise, the proceeds to step 508.

In step 508, the called PIP server sets multimedia portal contents in consideration of multimedia portal contents setting priority and presence information of a called terminal user, and then proceeds to step 510. In step 510, the called PIP server transmits an INVITE message to a called IMS server.

Figure 6:
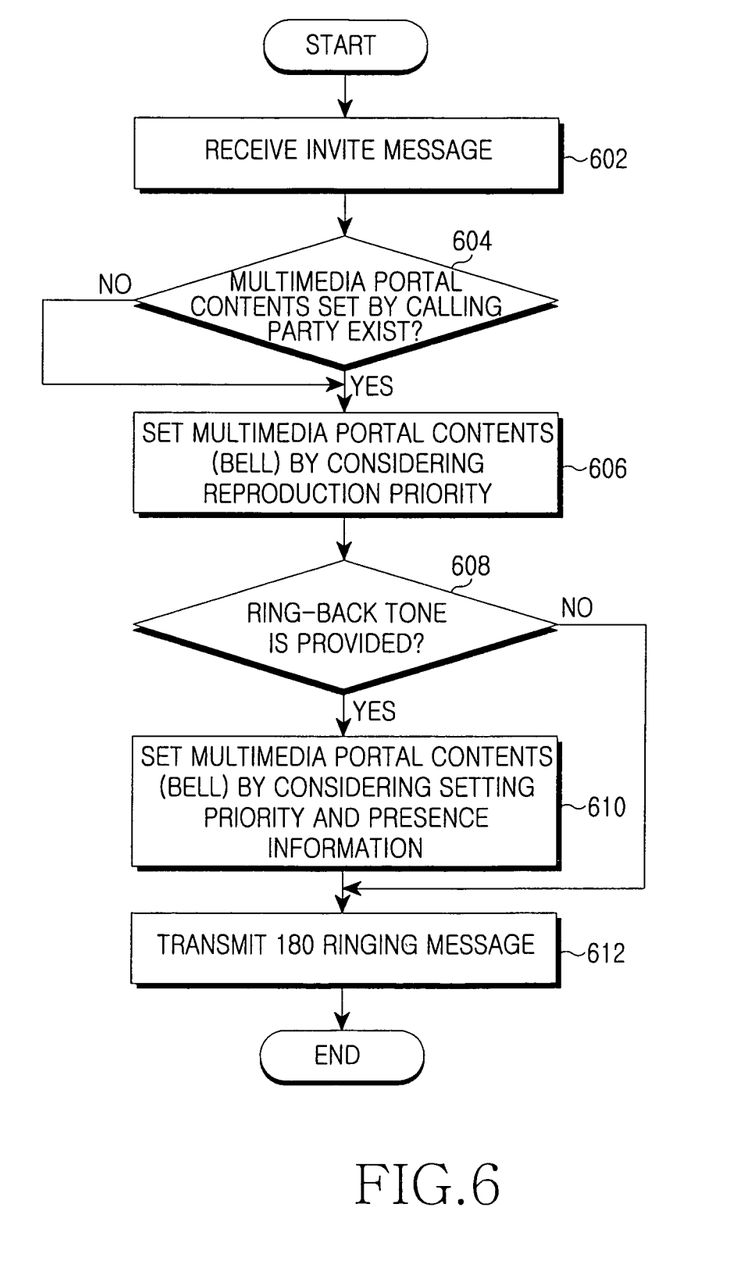
FIG. 6 is a flowchart illustrating an operational procedure in which a called terminal reproduces multimedia portal contents provided as a bell, and provides a ring-back tone to a calling terminal in accordance with the present invention.

FIG. 6 illustrates a flowchart of an operational procedure in which a called terminal reproduces multimedia portal contents provided as a bell, and provides a ring-back tone to a calling terminal according to the present invention. To be specific, FIG. 6 illustrates an operational procedure in which a called terminal provides a ring-back tone to a calling terminal according to presence information.

Referring to FIG. 6, in step 602, the called terminal receives an INVITE message from a called IMS server, and then proceeds to step 604. In step 604, the called terminal determines if multimedia portal contents set by a calling party exists in the INVITE message. If, as a result of the determination in step 604, it is determined that multimedia portal contents exists in the INVITE message, in step 606, the called terminal compares the priority of the multimedia portal contents included in the INVITE message with that of multimedia portal contents set by the called terminal or a called terminal user to thereby reproduces the multimedia portal contents having the highest priority, and then proceeds to step 608. However, if multimedia portal contents set by the calling party does not exist, in step 606, the called terminal reproduces multimedia portal contents set by itself or the called terminal user as a bell or reproduces a pre-stored basic bell when the calling and called parties set no multimedia portal contents, and then proceeds to step 608.

In step 608, the called terminal determines whether to provide a ring-back tone to a calling terminal. If the called terminal determines in step 608 to provide a ring-back tone to the calling terminal, it proceeds to step 610. However, if the called terminal determines in step 608 not to provide a ring-back tone, it proceeds to step 612. In step 610, the called terminal sets multimedia portal contents in consideration of multimedia portal contents setting priority and presence information of the calling or called terminal user, and then proceeds to step 612. In step 612, the called terminal transmits a 180 ringing message including the set multimedia portal contents or including no ring-back tone information to a called IMS server.

Figure 7:
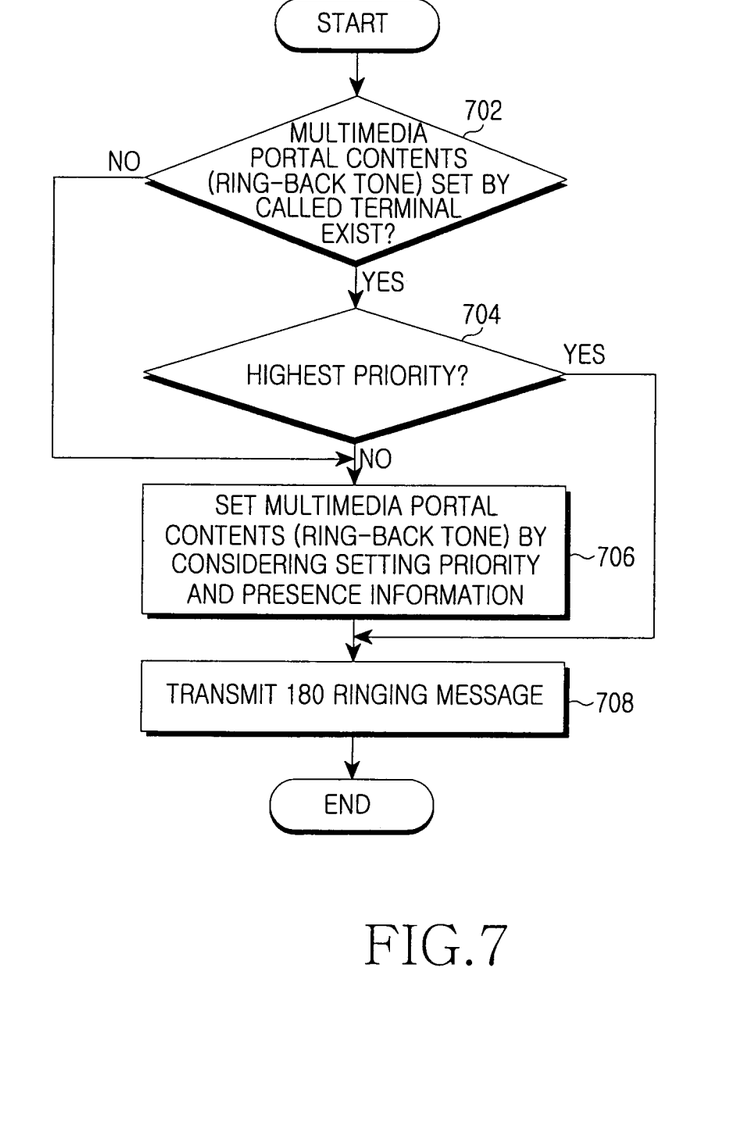
FIG. 7 is a flowchart illustrating an operational procedure in which a called PIP server provides multimedia portal contents as a ring-back tone in accordance with the present invention.

FIG. 7 illustrates a flowchart of an operational procedure in which a called PIP server provides multimedia portal contents as a ring-back tone to a calling terminal according to the present invention. To be specific, FIG. 7 illustrates an operational procedure in which a called PIP server provides multimedia portal contents as a ring-back tone to a calling terminal according to presence information.

Referring to FIG. 7, in step 702, the called PIP server determines if there are multimedia portal contents set by a called terminal. If as a result of the determination in step 702 it is determined there is multimedia portal contents set by the called terminal, the called PIP server proceeds to step 704. However, if multimedia portal content is determined not exist, the called PIP server proceeds to step 706.

In step 704, the called PIP server determines if the set multimedia portal content has the highest priority. If as a result of the determination in step 704, it is determined that the set multimedia portal content has the highest priority, the called PIP server proceeds to step 708. Alternatively, it proceeds to step 706. In step 706, the called PIP server sets multimedia portal content to be provided to a calling terminal in consideration of multimedia portal contents (ring-back tone) setting priority and presence information set by a user, and then proceeds to step 708. In step 708, the called PIP server transmits a 180 ringing message including information on the set multimedia portal contents to a calling IMS server.

Figure 8:
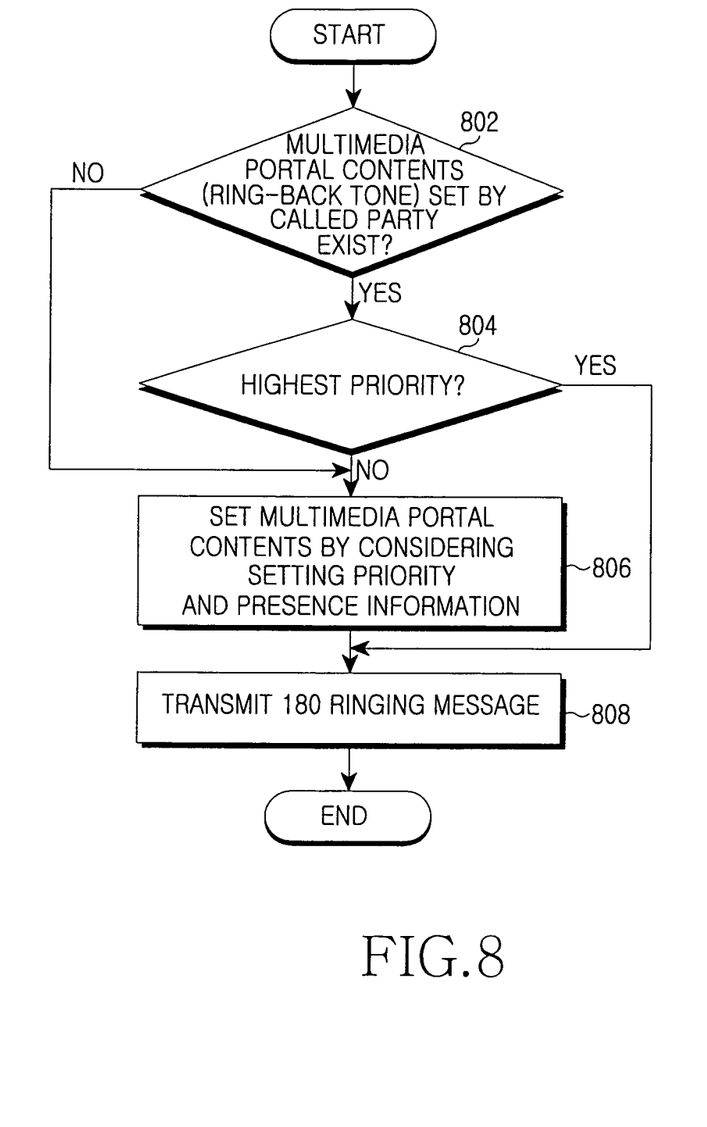
FIG. 8 is a flowchart illustrating an operational procedure in which a calling PIP server provides multimedia portal contents as a ring-back tone in accordance with the present invention.

FIG. 8 illustrates a flowchart of an operational procedure in which a calling PIP server provides multimedia portal contents as a ring-back tone to a calling terminal according to a the present invention. To be specific, FIG. 8 illustrates an operational procedure in which a calling PIP server provides multimedia portal contents as a ring-back tone to a calling terminal according to presence information.

Referring to FIG. 8, in step 802, the calling PIP server determines if there is multimedia portal contents set by a called terminal. If as a result of the determination in step 802 it is determined that there is multimedia portal contents set by a called terminal, the calling PIP server proceeds to step 804. However, if multimedia portal content is determined not exist, the calling PIP server proceeds to step 806.

In step 804, the calling PIP server determines if the set multimedia portal contents has the highest priority. If, as a result of the determination in step 804, it is determined that the set multimedia portal content has the highest priority, the calling PIP server proceeds to step 808. Alternatively, it proceeds to step 806.

In step 806, the calling PIP server sets multimedia portal contents to be provided to a calling terminal in consideration of multimedia portal contents setting priority and presence information set by a user, and then proceeds to step 808. In step 808, the calling PIP server transmits a 180 ringing message including the set multimedia portal contents to a calling IMS server.

Figure 9:
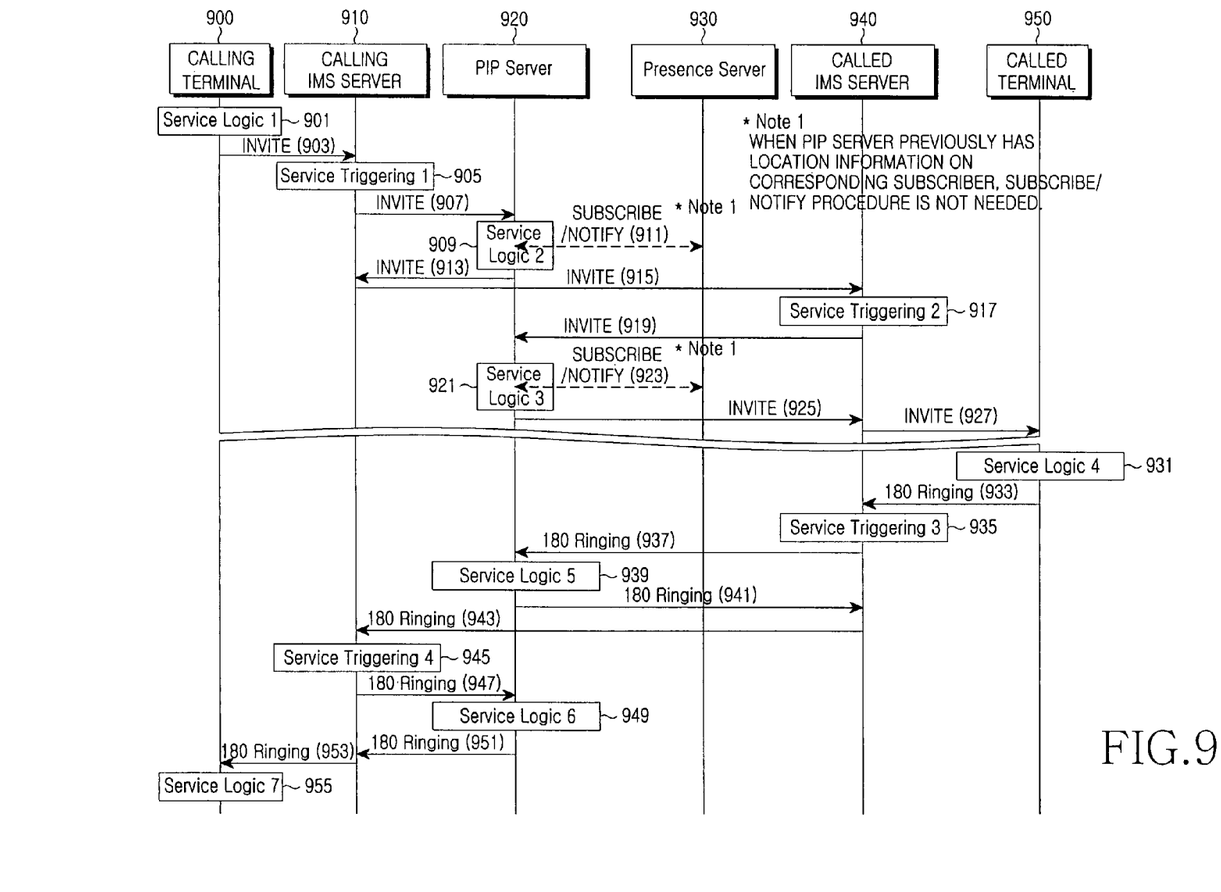
FIG. 9 is a flow diagram illustrating a method for providing multimedia portal contents in accordance with the present invention.

FIG. 9 illustrates signal flows for providing multimedia portal contents of the present invention. To be specific, FIG. 9 illustrates signal flows in which a calling or called terminal provides multimedia portal contents in the form of a bell or ring-back tone according to its location information.

Referring to FIG. 9, a calling terminal 900 performs service logic 1 before requesting call connection setup to a calling IMS server 910 (step 901). The service logic 1 refers to a procedure in which a calling terminal user personally sets multimedia portal contents suitable to his/her location as a bell, the calling terminal 900 sets multimedia portal contents as a bell according to location information set by the user, or the calling terminal 900 acquires location information of a called terminal 950 before a call attempt and sets multimedia portal contents suitable to the acquired location information as a bell. Of course, the calling terminal 900 may not set specific multimedia portal contents as a bell. Here, the location information may be provided through a GPS as exemplified above.

Next, the calling terminal 900 transmits an INVITE message for requesting call connection setup to the calling IMS server 910 (step 903). If the calling terminal 900 sets specific multimedia portal contents, then the set multimedia portal contents is included in the INVITE message. As an example, multimedia portal contents information in the form of "Alert-Info: http://www.example.com/movie/multimedia.avi>" may be included in a header portion of the INVITE message.

As the calling IMS server 910 receives the INVITE message including multimedia portal contents information from the calling terminal 900, it performs service triggering 1 (step 905). Here, the service triggering refers to a procedure in which, when a calling terminal requests call connection setup, an IMS server determines which service is provided to the calling terminal, and requests a corresponding service to an application server providing the service, that is, a PIP server 920 as shown in FIG. 9. By means of the service triggering 1, the calling IMS server 910 transmits the INVITE message to the PIP server 920 (step 907).

If the PIP server 920 receives the INVITE message, it performs service logic 2 for setting multimedia portal contents based on location information of the calling terminal 900 (step 909). If there are multimedia portal contents set by the calling terminal 900, the PIP server 920 uses the set multimedia portal contents in its entirety. Here, the set multimedia portal contents is used pursuant to the priority of setting multimedia portal contents according to location information. After the PIP server 920 performs the service logic 2, it transmits the INVITE message to the calling IMS server 910 (step 913). In the meantime, the PIP server 920 can acquire location information of each terminal user by periodically or non-periodically communicating with a location server 930 for maintaining/managing the location information of each terminal user, that is, by transmitting a location information request message to the location server (steps 911 and 923). Here, the PIP server 910 can acquire location information from the location server 930, and the calling terminal 900 or the called terminal 950 can acquire the above-mentioned presence information from a presence server for maintaining/managing presence information.

The calling IMS server 910 then transmits the INVITE message to a called IMS server 940 (step 915). As the called IMS server 940 receives the INVITE message, it performs service triggering 2 (step 917). Thereafter, the called IMS server 940 transmits the INVITE message to the PIP server 920 because the called terminal 950 corresponding to a destination of the INVITE message sets multimedia portal contents according to its location information (step 919). However, if the called terminal 950 does not set multimedia portal contents, then the INVITE message in step 915 is transmitted intact to the called terminal 950.

Next, the PIP server 920 performs service logic 3 for setting multimedia portal contents according to location information of the called terminal 950 (step 921). Even if there are multimedia portal contents set by the calling terminal 900, the PIP server 920 selects multimedia portal contents set by the called terminal 950 as a bell, based on the priority of multimedia portal contents setting. The PIP server 920 transmits the INVITE message including multimedia portal contents information set as described above to the called IMS server 940 (step 925). The called IMS server 940 transmits the received INVITE message to the called terminal 950 (step 927).

The called terminal 950 reproduces multimedia portal contents through service logic 4, and determines a ring-back tone to be provided to the calling terminal 900 (step 931). That is, the called terminal 950 recognizes the multimedia portal contents information included in the INVITE message as a bell, and reproduces the same. The multimedia portal contents reproduced in the called terminal 950 may be various types of contents such as audio, a still image, a moving picture, a flash animation and the like.

Prior to the transmission of a 180 ringing message, the called terminal 950 performs the following optional procedure of setting a ring-back tone to be provided to the calling terminal 900, as a part of the service logic 4 operation: —The called terminal sets multimedia portal contents to be provided as a ring-back tone according to location information of a called terminal user; or When the called terminal has already acquired location information of the calling terminal, it sets multimedia portal contents to be provided as a ring-back tone according to the acquired location information.

The called terminal 950 then transmits the 180 ringing message including the set or non-set multimedia portal contents information to the called IMS server 940 (step 933). Herein, it is assumed that the called terminal 950 sets specific multimedia portal contents as a ring-back tone. The called IMS server 940 recognizes the multimedia portal contents information included in the 180 ringing message, and performs service triggering 3 for transmitting the message to the PIP server 920 (step 935). The called IMS server 940 transmits the 180 ringing message to the PIP server 920 (step 937).

Next, the PIP server 920 performs service logic 5 for setting multimedia portal contents to be provided as a ring-back tone according to location information of a called terminal user (step 939). If there are multimedia portal contents set by the called terminal 950, the PIP server uses the multimedia portal contents set by the called terminal 950 in its entirety. The PIP server 920 transmits the 180 ringing message to the called IMS server 940 (step 941). The called IMS server 940 then transmits the 180 ringing message to the calling IMS server 910 (step 943). The calling IMS server 910 performs service triggering 4 to recognize that the 180 ringing message be transmitted to the PIP server 920 (step 945), and then transmits the 180 ringing message to the PIP server 920 (step 947).

The PIP server 920 performs service logic 6 for setting multimedia portal contents to be provided as a ring-back tone according to location information of a calling terminal user (step 949). If multimedia portal contents set by a called party and multimedia portal contents set by a calling party exist together, the PIP server 920 provides the multimedia portal contents set by the calling party as a ring-back tone pursuant to the priority of multimedia portal contents setting. In this way, the PIP server 920 transmits the 180 ringing message to the calling IMS server 910 (step 951).

The calling IMS server 910 then transmits the 180 ringing message to the calling terminal 900 (step 953). The calling terminal 900 performs service logic 7 for reproducing multimedia portal contents included in the 180 ringing message (step 955).

A method for providing multimedia portal contents in FIG. 9 includes the following three methods:

(1) multimedia portal contents of a binary format are carried by an INVITE message, and a terminal executes the binary multimedia portal contents.

(2) an INVITE message includes a URL (Uniform Resource Locator) address of multimedia portal contents, and a terminal downloads the multimedia portal contents from the corresponding URL and executes the downloaded multimedia portal contents.

(3) information enabling real-time connection with a server for providing multimedia portal contents is included in an INVITE message, and a terminal sets up real-time connection with the corresponding server by using the INVITE message and receives the multimedia portal contents from the server.

In order to perform the operations described in FIG. 9, the respective terminals and servers must execute or provide the following functions:

1. Calling and Called Terminals Requirements:
   A terminal provide an interface and a function enabling a user to select multimedia portal contents according to his/her location.
   A terminal performs a function of setting multimedia portal contents based on location information acquired form a presence server; and
   A terminal executes and receive multimedia portal contents provided through a bell or ring-back tone.
2. PIP Server Requirements:
   A PIP server acquiring location information of a user from a location server:
   A PIP server selects and transmits multimedia portal contents based on location information of a user; and
   A PIP server selects and transmits multimedia portal contents in consideration priority when all of users/terminals/calling and called PIP servers set multimedia portal contents.

Here, since the calling terminal's, the calling PIP server's, the called PIP server's and the called terminal's operations for providing multimedia portal contents as a bell or ring-back tone according to location information, as described in FIG. 9, are similar to those in the above-mentioned case of providing multimedia portal contents according to presence information, for the sake of clarity, a detailed description thereof has been omitted.

As described above, according to the present invention, multimedia portal content is provided as a bell or ring-back tone in consideration of presence or location information set by a user, so that it is advantageously possible to provide diversified, differentiated and tailored services. Further, a provider or an operator who provides or operates the multimedia portal contents can create various profit structures such as advertising revenue and so forth.

While the invention has been shown and described with reference to a certain preferred embodiment thereof, it will be understood by those skilled in the art that various changes in form and details may be made therein without departing from the spirit and scope of the invention as defined by the appended claims and equivalents thereof.

What is claimed is:

1. A method for receiving a ring-back tone by a calling terminal, the method comprising: selecting first multimedia portal content among a plurality of multimedia portal content, based on calling information of the calling terminal; transmitting, to a server, a call connection setup request including information on the first multimedia portal content; receiving, from the server, a ring-back tone corresponding to one of the first multimedia portal content and second multimedia portal content selected by a called terminal, according to a predetermined multimedia portal content priority; and if the second multimedia portal content is not available, receiving from the server, a ring-back tone corresponding to the first multimedia portal content, wherein the calling information of the calling terminal includes at least one of location information and presence information of the calling terminal.

2. The method of claim 1, wherein each of the first multimedia portal content and the second multimedia portal content includes at least one of an Internet web page, a still image, a moving picture, a Wireless Application Protocol (WAP), and audio.

3. The method of claim 1, wherein a priority of the first multimedia portal content is higher than a priority of the second multimedia portal content.

4. The method of claim 1, wherein the second multimedia portal content is selected based on one of the calling information of the calling terminal and called information of the called terminal.

5. A method for providing a ring-back tone by a server, the method comprising: receiving, from a calling terminal, a call connection setup request including information on first multimedia portal content selected based on calling information of the calling terminal; determining whether information on second multimedia portal content selected by a called terminal is received from the called terminal; if the information on the second multimedia portal content is received from the called terminal, transmitting a ring-back tone corresponding to one of the first multimedia portal content and the second multimedia portal content, according to a predetermined multimedia portal content priority; and if the second multimedia portal content is not received from called terminal, transmitting a ring-back tone corresponding to the first multimedia portal content to the calling terminal,
   wherein the calling information of the calling terminal includes at least one of location information and presence information of the calling terminal.

6. The method of claim 5, wherein each of the first multimedia portal content and the second multimedia portal content includes at least one of an Internet web page, a still image, a moving picture, a Wireless Application Protocol (WAP), and audio.

7. The method of claim 5, wherein a priority of the first multimedia portal content is higher than a priority of the second multimedia portal content.

8. The method of claim 5, wherein the second multimedia portal content is selected based on one of the calling information of the calling terminal and called information of the called terminal.

9. A method for reproducing a ring-tone by a called terminal, the method comprising: selecting first multimedia portal content to be used as a ring-tone, among a plurality of multimedia portal content; receiving a call connection setup request message transmitted by a calling terminal; determining whether the call connection setup request message includes information on second multimedia portal content selected by the calling terminal; if the call connection setup request message includes the information on the second multimedia portal content, comparing a priority of the first multimedia portal content with a priority of the second multimedia portal content; reproducing one of the first multimedia portal content and the second multimedia portal content according to a result of the comparison; and if the call connection setup request message does not include the information on the second multimedia portal content, reproducing the first multimedia portal contents,
   wherein each of the first multimedia portal content and the second multimedia portal content is selected based on one of calling information of the calling terminal and called information of the called terminal, wherein the called information includes at least one of location information and presence information of the called terminal, and wherein the calling information includes at least one of location information and presence information of the calling terminal.

10. The method of claim 9, wherein each of the first multimedia portal content and the second multimedia portal content includes at least one of an Internet web page, a still image, a moving picture, a Wireless Application Protocol (WAP), and audio.

11. The method of claim 9, wherein the priority of the first multimedia portal content is higher than the priority of the second multimedia portal content.

12. A calling terminal for receiving a ring-back tone, the calling terminal comprising: a transmitter; a receiver; and a controller for selecting first multimedia portal content among a plurality of multimedia portal content, based on calling information of the calling terminal, controlling to the transmitter for transmitting, to a server, a call connection setup request including information on the first multimedia portal content, and controlling to the receiver for receiving, from the server, a ring-back tone corresponding to one of the first multimedia portal content and second multimedia portal content selected by a called terminal, according to a predetermined multimedia portal content priority, wherein the calling information of the calling terminal includes at least one of location information and presence information of the calling terminal, wherein the receiver receives from the server, a ring-back tone corresponding to the first multimedia portal content, if the second multimedia portal content is not available.

13. The calling terminal of claim 12, wherein each of the first multimedia portal content and the second multimedia portal content includes at least one of an Internet web page, a still image, a moving picture, a Wireless Application Protocol (WAP), and audio.

14. The calling terminal of claim 12, wherein a priority of the first multimedia portal content is higher than a priority of the second multimedia portal content.

15. The calling terminal of claim 12, wherein the second multimedia portal content is selected based on one of the calling information of the calling terminal and called information of the called terminal.

16. A server for providing a ring-back tone, the server comprising: a transmitter; a receiver; and a controller for controlling to the receiver for receiving, from a calling terminal, a call connection setup request including information on first multimedia portal content selected based on calling information of the calling terminal, determining whether information on second multimedia portal content selected by a called terminal is received from the called terminal, and, if the information on the second multimedia portal content is received from the called terminal, controlling to the transmitter for transmitting a ring-back tone corresponding to one of the first multimedia portal content and the second multimedia portal content, according to a predetermined multimedia portal content priority,
wherein the calling information of the calling terminal includes at least one of location information and presence information of the calling terminal, wherein the transmitter transmits a ring-back tone corresponding to the first multimedia portal contents to the calling terminal, if the second multimedia portal content is not received from called terminal.

17. The server of claim 16, wherein each of the first multimedia portal content and the second multimedia portal content includes at least one of an Internet web page, a still image, a moving picture, a Wireless Application Protocol (WAP), and audio.

18. The server of claim 16, wherein a priority of the first multimedia portal content is higher than a priority of the second multimedia portal content.

19. The server of claim 16, wherein the second multimedia portal content is selected based on one of the calling information of the calling terminal and called information of the called terminal.

20. A called terminal for reproducing a ring, the called terminal comprising: a transmitter; a receiver; and a controller for controlling to the receiver for receiving a call connection setup request message transmitted by a calling terminal, determining whether the call connection setup request message includes information on second multimedia portal content selected by the calling terminal, if the call connection setup request message includes the information on the second multimedia portal content, compares a priority of the first multimedia portal content with a priority of the second multimedia portal content, and reproducing one of the first multimedia portal content and the second multimedia portal content according to a result of the comparison, wherein each of the first multimedia portal content and the second multimedia portal content is selected based on one of calling information of the calling terminal and called information of the called terminal,
wherein the called information includes at least one of location information and presence information of the called terminal, and wherein the calling information includes at least one of location information and presence information of the calling terminal, wherein the controller reproduces the first multimedia portal content, if the call connection setup request message does not include the information on the second multimedia portal content.

21. The called terminal of claim 20, wherein each of the first multimedia portal content and the second multimedia portal content includes at least one of an Internet web page, a still image, a moving picture, a Wireless Application Protocol (WAP), and audio.

22. The called terminal of claim 20, wherein the priority of the first multimedia portal content is higher than the priority of the second multimedia portal content.

* * * * *